United States Patent [19]

Shimogawa et al.

[11] 4,027,905
[45] June 7, 1977

[54] SEAT BELT SYSTEM FOR VEHICLE

[75] Inventors: Toshiaki Shimogawa, Nishio; Masayuki Morita, Tokoname; Takashi Kawaharazaki, Ichinomiya, all of Japan

[73] Assignee: Nippon Soken, Inc., Nishio, Japan

[22] Filed: Sept. 12, 1975

[21] Appl. No.: 613,018

[30] Foreign Application Priority Data

Sept. 16, 1974 Japan ............... 49-111053[U]

[52] U.S. Cl. ............................. 280/746; 188/1 C; 297/386
[51] Int. Cl.[2] ........................................ B60R 21/10
[58] Field of Search ............ 280/150 SB, 744, 746, 280/747; 297/386; 188/1 C

[56] References Cited

UNITED STATES PATENTS

| | | | |
|---|---|---|---|
| 3,087,584 | 4/1963 | Jackson et al. | 188/1 C |
| 3,280,942 | 10/1966 | Millington | 297/386 X |
| 3,446,533 | 5/1969 | Radke et al. | 188/1 C X |
| 3,561,819 | 2/1971 | Renneker | 188/1 C X |
| 3,889,969 | 6/1975 | Otani | 280/150 SB |

*Primary Examiner*—Joseph F. Peters, Jr.
*Assistant Examiner*—Michael J. Forman
*Attorney, Agent, or Firm*—Cushman, Darby & Cushman

[57] ABSTRACT

A seat belt system for vehicle wherein one end of a seat belt for restraining an occupant is firmly engaged with one end of a steel strip which is held and guided by an anchor member firmly attached to a vehicle body in such a way that when the impact energy acts upon the seat belt, thereby forcing the steel strip out of the anchor member, the strip may be subjected to plastic deformation at least at two positions, whereby the impact energy may be converted into the forces for bending the steel strip as the latter being pulled out of the anchor member. Thus, the impact energy acting on the occupant during a collision may be effectively and safely absorbed.

5 Claims, 12 Drawing Figures

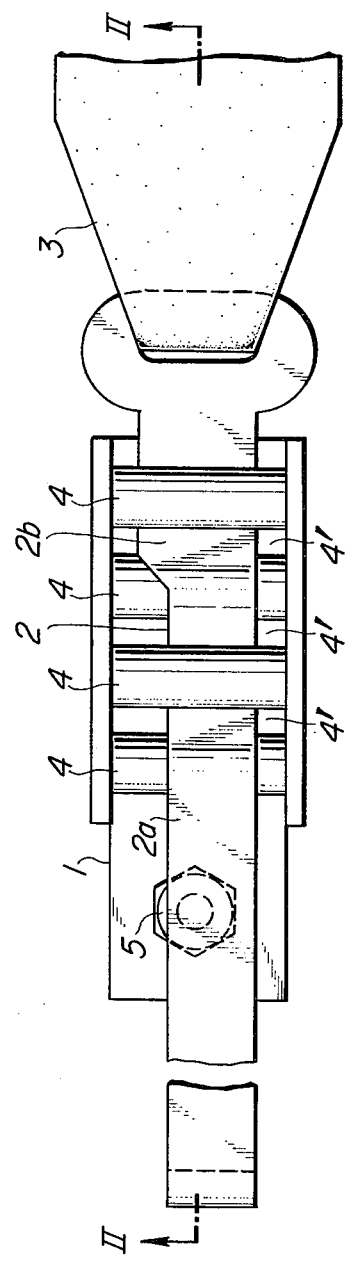
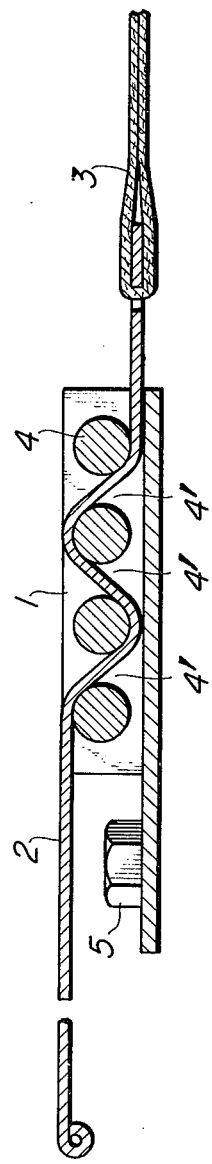

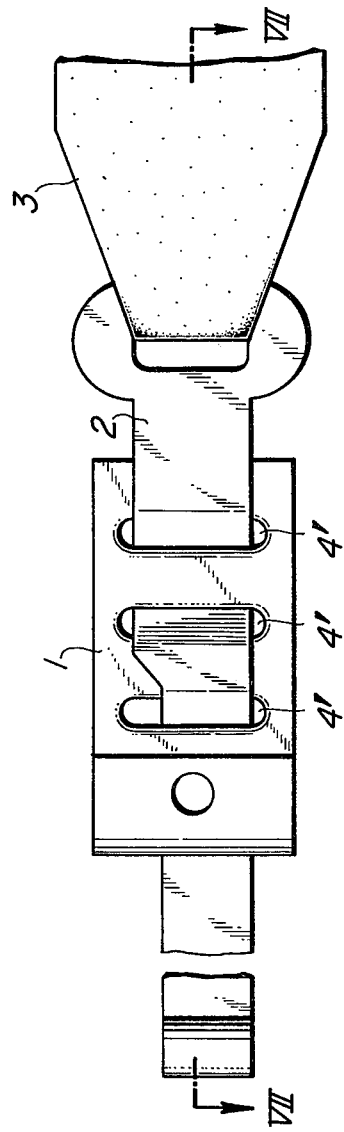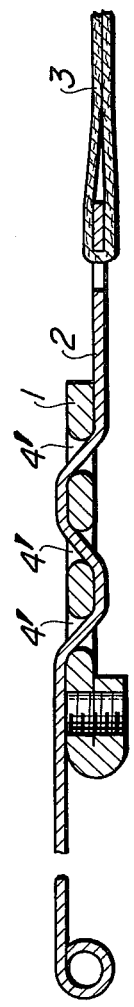
FIG. 6
FIG. 7

SEAT BELT SYSTEM FOR VEHICLE

BACKGROUND OF THE INVENTION

The present invention relates to a safety seat belt system for use in a vehicle, especially in an automotive vehicle, which system may effectively and safely absorb the impact energy during a collision or the like.

There has been devised and demonstrated an impact energy absorbing device for use with a seat belt system wherein the impact energy acting upon a seat belt due to the sudden acceleration of an occupant during a collision or the like is converted into the force for bending a U-shaped steel strip. However, the greater frictional resistance is generated between the U-shaped strip and a case to which is firmly attached one end of the strip when the strip is bent so that the critical load can not be fixed. As a result, the desired impact energy absorbing characteristics cannot be attained. Furthermore since the U-shaped steel strip and the case are formed integral, in determining a set load limit not only the force for bending the U-shaped strip but also the force for shearing the U-shaped strip away from the case must be taken into consideration. Thus, the conventional energy absorbing device is not satisfactory in practice. Moreover, its energy absorbing efficiency is unsatisfactory. To improve the efficiency, the steel strip must have a greater thickness and width, thus resulting in the increase in the size of the shock absorbing device. Therefore, it becomes impossible to install the energy absorbing device in the space above the shoulder of an occupant.

SUMMARY OF THE INVENTION

One of the objects of the present invention is to provide a vehicle seat belt system which has a higher impact energy absorbing efficiency than any of the conventional seat belt systems.

A further object of the present invention is to provide a vehicle seat belt system which is compact in size yet capable of attaining the desired energy absorbing characteristics.

Briefly stated, to the above and other objects, the present invention provides a vehicle seat belt system comprising a seat belt for restraining an occupant, a metal strip having one end thereof firmly engaged with one end of said seat belt, an anchor member firmly attached to a vehicle body for holding and guiding said strip in such a way that when said strip is forced to be pulled out by the impact exerted to the seal belt, the strip may be subjected to bending at least at two positions.

The above and other objects, features and advantages of the present invention will become more apparent from the following description of illustrative embodiments thereof taken in conjunction with the accompanying drawings.

BRIEF DESCRIPTION OF THE DRAWING

FIG. 1 is a top view of a first embodiment of the present invention;

FIG. 2 is a sectional view taken along the line II—II of FIG. 1;

FIG. 6 is a top view of a third embodiment of the present invention;

FIG. 7 is a sectional view taken along the line VII—VII of FIG. 6;

Same reference numerals are used to designate similar parts throughout the figures.

DESCRIPTION OF THE PREFERRED EMBODIMENTS

First Embodiment, FIGS. 1–4

Figure 3:
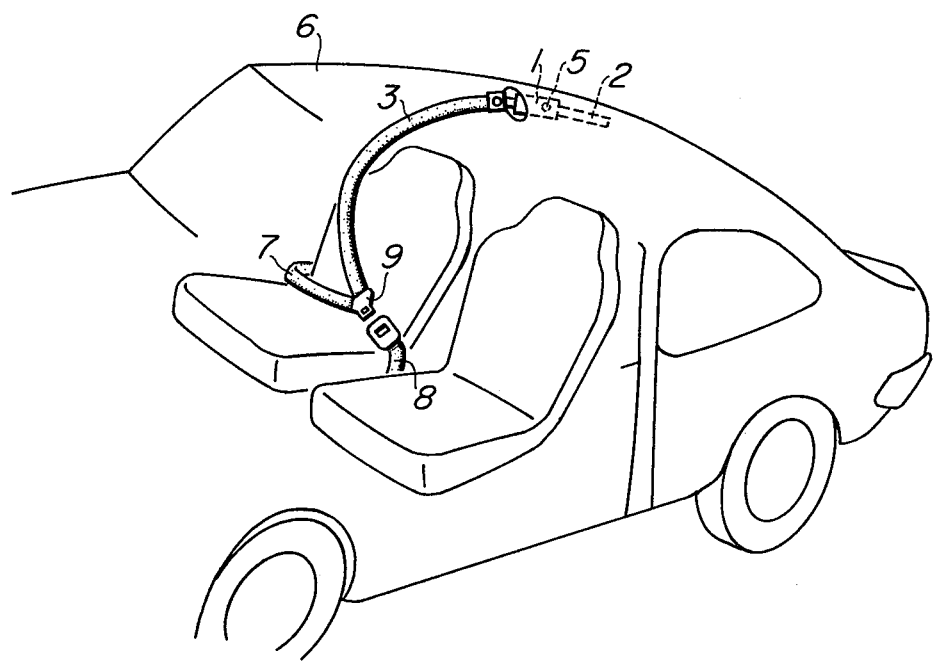
FIG. 3 is a perspective view showing the first embodiment installed in an automotive vehicle.

Referring to FIGS. 1 and 2, reference numeral 1 denotes an anchor firmly fixed to a vehicle body; 2, a steel strip; 3 a seat belt having one end portion thereof fitted through an opening formed at one end portion of the steel strip 2, folded back by 180° and sewn itself as best shown in FIG. 2; and 4, transverse shafts disposed in parallel with each other and spaced apart from each other between the side walls of the anchor 1 at right angles with respect to the longitudinal axis thereof, thereby defining slits 4' between them. The steel strip 2 is extended through these slits 4' and partly wrapped around the shafts 4 in the zig-zag form as best shown in FIG. 2.

As shown in FIG. 3, the energy absorbing device with the above construction has its anchor 1 firmly attached with a bolt (not shown) and a nut 5 to the upper portion of the vehicle body 6 for instance, the roof as shown in FIG. 3, and is used for a seat belt system which further comprises a lap belt 7, an inner belt 8, a tongue plate 9, and a belt coiler including a mechanism for locking the seat belt system in case of a collision or the like.

Figure 4:
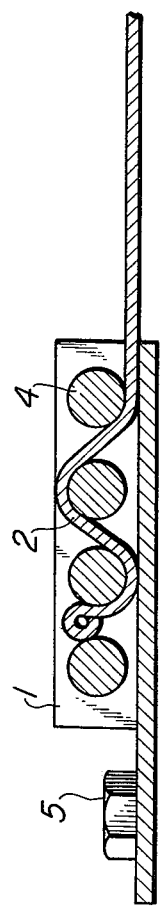
FIG. 4 is a sectional view of the first embodiment used for explanation of the mode of operation thereof.

Next referring further to FIG. 4, the mode of operation will be described. When the vehicle collides so that the impact or acceleration is exerted to an occupant, the seat belt is locked to restrain the occupant so that the occupant restraining force; that is, the impact energy for preventing the movement of the occupant acts upon the seat belt 3. The impact energy forces the seat belt 3 to draw the steel strip 2 out of the anchor 1. That is, when the impact energy exceeds the critical force causing the bending at several positions of the steel strip 2, the latter is bent and drawn out of the anchor 1.

The impact energy exerted to the seat belt 3 therefore will not exceed the bending stresses acting upon the steel strip 2 so that the impact energy may be absorbed. When the forced drawing or pulling of the steel strip 2 is stopped as shown in FIG. 4, only the tension load is exerted thereto. The strength of the steel strip 2 is dependent upon the cross sectional configuration.

Referring back to FIG. 1, the steel strip 2 has a wide portion 2b and a reduced portion 2a. After the wide portion 2b has been drawn out of the anchor 1, the reduced portion 2a is pulled out of the anchor 1 while being bent so that the bending load exerted thereto is reduced. As a result, the occupant restraining force is reduced accordingly. Therefore, the desired shock or impact energy absorbing characteristics may be attained by suitably changing the width of the steel strip 2.

Figure 5:
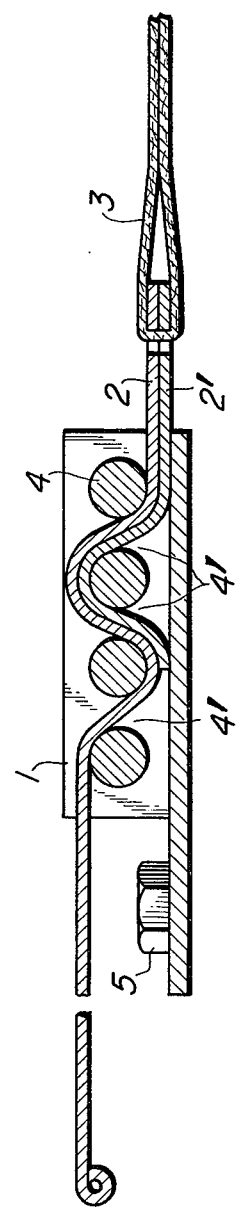
FIG. 5 is a sectional view of a second embodiment of the present invention.

Second Embodiment, FIG. 5

The second embodiment shown in FIG. 5 is substantially similar in construction to the first embodiment except that in order to obtain the desired impact energy characteristics an additional steel strip 2' is laminated over the shock absorbing steel strip 2 and wrapped around the shafts 4 in the zig-zag form. The steel strips 2 and 2' may have the same width.

Third Embodiment, FIGS. 6 and 7

The third embodiment shown in FIGS. 6 and 7 is substantially similar in construction to the first embodiment except the construction of the anchor 1. That is the anchor 1 is in the form of a plate provided with a plurality of slits 4' spaced apart from each other by a suitable distance in the longitudinal direction of the anchor 1. The steel strip 2 is alternately inserted into these slits 4' in the zig-zag form. The third embodiment has the impact absorbing function similar to those of the first and second embodiments, and has a distinct advantage over them in that the construction is simpler; that is, the number of the structural members is less.

Even though the first, second and third embodiments are compact in size, they may very efficiently absorb the impact or shock energy because the steel strip 2 (and the additional steel strip 2' in the second embodiment) is subjected to the bending stresses at many portions.

Fourth Embodiment, FIGS. 8–11

Figure 8:
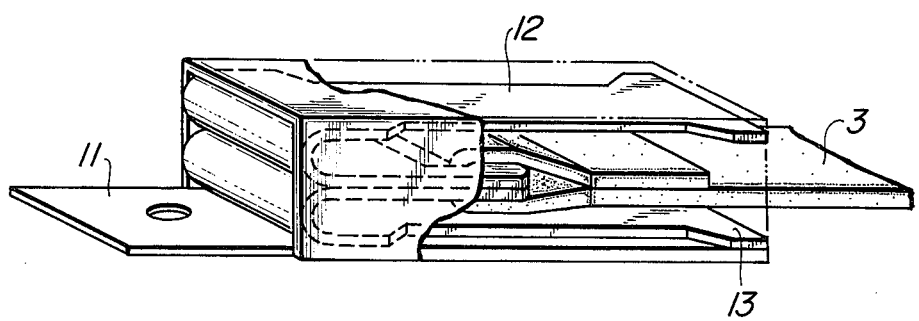
FIG. 8 is a perspective view of a fourth embodiment of the present invention, the walls of a case being partly broken away.
Figure 9:
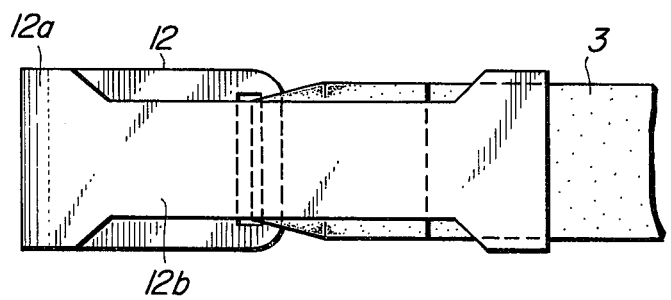
FIG. 9 is a top view of one of the U-shaped srips used in the fourth embodiment.

Referring to FIGS. 8 and 9, reference numeral 11 denotes a case which is firmly attached to an automotive vehicle body; and 12, and 13, U-shaped strips one ends of which are firmly attached to the bottom and top plates of the case 1 and the other ends of which are firmly attached to one end of the seat belt 3. The shorter or inner leg portions of the U-shaped strips 12 and 13 are made in contact with each other as best shown in FIG. 8.

In the instant embodiment, the U-shaped strips 12 and 13 are made of steel, and each consists of a wide portion 12a and a reduced portion 12b as shown in FIG. 9. The wide portion 12a may absorb a greater impact energy while the reduced portion 12b absorb a relatively small impact energy so that the desired impact energy absorbing characteristics may be obtained. The same is true for the U-shaped strip 13 which has a wide portion and a reduced portion.

The seat belt 3 has its one end firmly engaged with the other ends of the U-shaped strips 12 and 13 in the manner described in conjunction with the first embodiment, and has its the other end attached to a conventional retractor or anchor (not shown).

Figure 10:
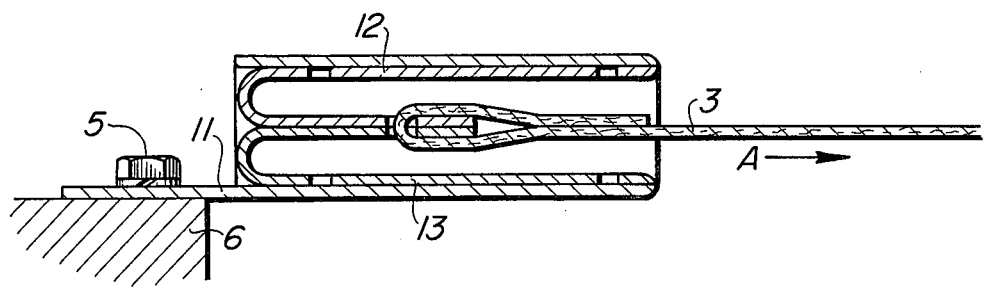
FIGS. 10 and 11 are views used for explanation of the mode of operation of the fourth embodiment.

Next referring to FIGS. 10 and 11, the mode of operation of the fourth embodiment with the above construction will be described. Under the normal conditions, no force for restraining an occupant is exerted to the seat belt 3 so that the U-shaped strips 12 and 13 are maintained in the shape shown in FIG. 10, but when the occupant restraining force exerted to the seat belt during a collision or the like exceeds the critical bending force of the strips 12 and 13; that is, the force required for bending them, the strips 12 and 13 are bent and forced to be pulled out of the case 11 in the direction indicated by the arrow A. That is, the impact force exerted to the seat belt 3 may be converted into the forces deforming the strips 12 and 13.

At the initial stage of the impact exerted to the seat belt 3, the wide portions of the U-shaped strips 12 and 13 absorb the greater energy as they are bent, and when the reduced portions are bent, they absorb the less energy. Therefore, the desired impact energy absorbing characteristics may be obtained.

Figure 11:
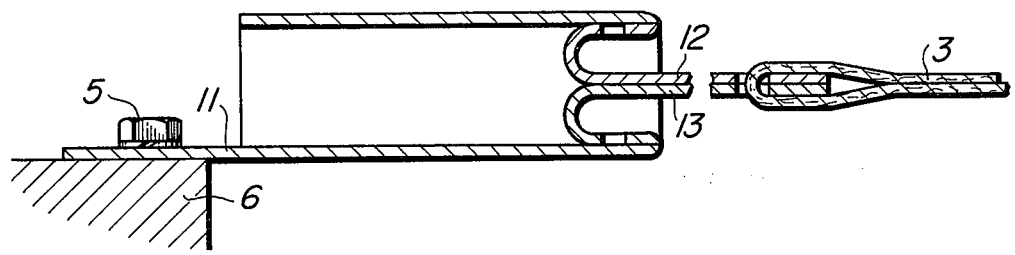

When the U-shaped strips 12 and 13 are pulled out to the position as shown in FIG. 11, they will not be pulled out any longer so that the impact energy absorbing function is completed. When the strips 12 and 13 are made of steel, their tensile strength is, in general, greater than the bending strength. Therefore, the cross sectional area of the U-shaped strips 12 and 13 is so selected that they may sufficiently withstand the occupant restraining force exerted to the seat belt 3. Furthermore, the bending force applied to the strips 12 and 13 may be suitably controlled by suitably selecting the radius of curvature of the bent portion. Since there is no frictional resistance between the case 11 and the U-shaped strips 12 and 13, the fabrication of the impact absorbing device may be much facilitated, and the stable shock absorbing characteristics may be ensured.

Figure 12:
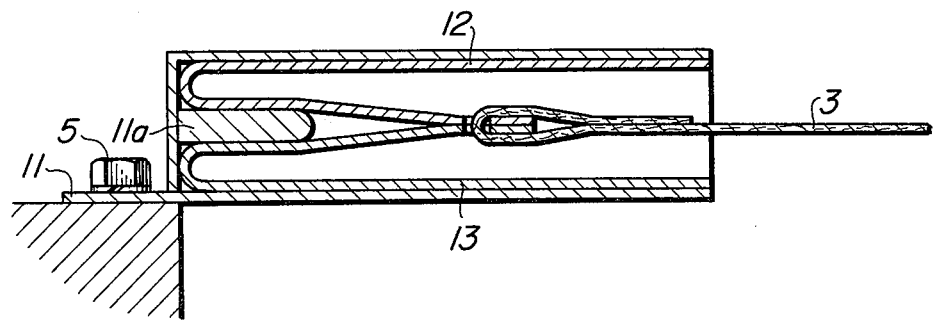
FIG. 12 is a sectional view of a fifth embodiment of the present invention.

Fifth Embodiment, FIG. 12

The fifth embodiment shown in FIG. 12 is substantially similar in construction to the fourth embodiment except that the case 11 has a a spacer 11a formed integral therewith and extended toward the seat belt 3 from the inner wall of the casing 11 for spacing the U-shaped strips 12 and 13 from each other in such a way that the radius of curvature of the bent portions of the strips 12 and 13 may be made small. Since the radius of curvature is small, the strips 12 and 13 may absorb the greater shock energy as long as they are forced to be pulled out in contact with the spacer 11a. When the strips 12 and 13 are out of contact with the spacer 11a, the radius of curvature of the bent portions is increased so that they are more easily bent than they are still in contact with the spacer. The fifth embodiment has a distinct advantage over the fourth embodiment in that desired impact energy absorbing characteristic may be obtained with the strips 12 and 13 having the same width over the whole length.

As a modification of the fourth embodiment, the strips 12 and 13 may have the same width over the whole length, and the portions corresponding to the wide portions 12a and 13a of the fourth embodiment may be spot welded at several points to the case 11. Therefore at the initial stage, the impact force may be converted to the force for bending the strips 12 and 13 and the forces for shearing the spot-welded joints. Alternatively, the short leg portions which are made into contact with each other may be joined by suitable means or method so that the additional force may be required for severing them apart.

In both the fourth and fifth embodiments, there is no friction between the U-shaped strips and the case so that the stable energy absorbing characteristics may be obtained. That is, the seat belt 3 is pulled out or extended in such a way that the secondary collision of an occupant may be positively prevented.

As described above, even though the impact energy absorbing device in accordance with the present invention is compact in size, the greater impact energy caused by a collision or the like may be absorbed according to a desired shock absorbing program.

It is to be understood that the devices according to the present invention may be incorporated into the two point seat belt installations with the anchor attached to the lower portion of the vehicle body.

What is claimed is:

1. A vehicle seat belt system, comprising:
   a seat belt for restraining an occupant;
   a seat belt anchor firmly secured to a vehicle body, said anchor having means providing a series of transversally extending, longitudinally spaced members having respective gaps between adjacent members in the series; and
   a variable effect shock absorber comprising a strip of metal woven through said gaps, said strip having a head end secured to one end of the seat belt downstream from said gaps and a tail end protruding upstream of said gaps; means providing a stop on said strip for cooperating with the anchor upon achievement of a predetermined amount of longitudinal advance of the strip;
   the transverse cross-sectional area and stiffness of the strip being such that the strip must progressively bend and overcome friction in order to advance through the gaps and accordingly a sustained pulling force is needed to cause said predetermined amount of longitudinal advance;
   the cross-sectional area of the strip decreasing from a larger value nearer the head end to a smaller value nearer the tail end, in a manner such that as the strip is pulled to longitudinally advance the strip said predetermined amount, at first the resistance offered to strip advancement is larger and then, as the smaller value transverse cross-sectional area traverses the gaps, the resistance offered to strip advancement decreases, in order to first provide maximum restraint during the initial part of a vehicle accident and to then provide some relaxation.

2. A vehicle seat belt system as set forth in claim 1 wherein
   said seat belt is of the three point type having a lap belt, and a shoulder belt,
   said anchor member is firmly attached to the upper portion of the vehicle body, and
   said one end of said strip is firmly engaged with one end of said shoulder belt.

3. A vehicle seat belt system as set forth in claim 1 wherein
   said anchor is in the form of a plate provided with a plurality of transverse slits spaced from each other by a suitable distance so that said strip may be inserted through said slits to provide a zig-zag form.

4. A vehicle seat belt system as set forth in claim 1, wherein said metal strip means is overlaid at a portion on the side of said one end thereof with an additional metal strip, thereby increasing the cross sectional area thereof at said portion.

5. A vehicle seat belt system as set forth in claim 1, wherein said metal strip means has a larger width at a portion on the side of said one end thereof than at the remaining portion thereof, thereby increasing the cross sectional area thereof at said former portion.

* * * * *